United States Patent
Ayama

[11] Patent Number: 5,952,444
[45] Date of Patent: Sep. 14, 1999

[54] POLYURETHANE COATING RESIN COMPOSITION

[75] Inventor: Koichi Ayama, Kumamoto, Japan

[73] Assignee: Chisso Corporation, Osaka, Japan

[21] Appl. No.: 08/925,183

[22] Filed: Sep. 8, 1997

[30] Foreign Application Priority Data

May 22, 1997 [JP] Japan ................................. 9-148538
May 22, 1997 [JP] Japan ................................. 9-148539

[51] Int. Cl.$^6$ ............................................. C08G 77/04
[52] U.S. Cl. ............................................. 528/28; 528/26
[58] Field of Search ................................. 528/28, 26

[56] References Cited

U.S. PATENT DOCUMENTS

| | | | |
|---|---|---|---|
| 3,243,475 | 3/1966 | Reischel et al. | 528/26 |
| 4,839,443 | 6/1989 | Akutsu et al. | 525/474 |
| 5,045,599 | 9/1991 | Murase | 525/102 |

FOREIGN PATENT DOCUMENTS

| | | |
|---|---|---|
| 60-238315 | 11/1985 | Japan . |
| 61-176639 | 8/1986 | Japan . |
| 63-470 | 1/1988 | Japan . |
| 64-11117 | 1/1989 | Japan . |
| 1-249821 | 10/1989 | Japan . |
| 6-116390 | 4/1994 | Japan . |

*Primary Examiner*—Melvyn I. Marquis
*Assistant Examiner*—Mark W. Milstead
*Attorney, Agent, or Firm*—Oblon, Spivak, McClelland, Maier & Neustadt, P.C.

[57] ABSTRACT

According to the present invention, there are here disclosed a polyurethane resin derivative having a polydimethylsiloxane side chain and an isocyanate group in a main chain of a polyurethane molecule which is obtainable by reacting (A) a polydimethylsiloxane having an alkyl group on one terminal and 2 hydroxyl groups in the vicinity of the other terminal with (B) a polyisocyanate having 2 or more isocyanate groups in one molecule; a coating resin composition which is obtainable by reacting a polyurethane resin derivative having a polydimethylsiloxane side chain and an isocyanate group in a main chain of a polyurethane molecule with a hydroxyl group-containing resin; and a method for curing the coating resin composition.

15 Claims, 10 Drawing Sheets

POLYURETHANE COATING RESIN COMPOSITION

BACKGROUND OF THE INVENTION

1. Field of the Invention

The present invention relates to a polydimethylsiloxane-modified urethane resin derivative and a dimethylsiloxane-modified urethane coating resin composition which are useful for applications such as a coating composition, a binder, an adhesive and a sealant, and a method for curing the composition.

2. Description of the Related Art

A polyurethane resin can be prepared by reacting a polymer or a monomer having a hydroxyl group in a molecule with a polymer or a monomer having an isocyanate group in a molecule. This resin is usually excellent in flexibility, adhesive properties, coating film formability and the dispersibility of a pigment or the like, and therefore it is often used as a binder for a coating composition, an ink base, an adhesive and a sealant.

Furthermore, for the purpose of more suitably fitting the polyurethane resin to these uses, or for the purpose of further enlarging the utilizable range of the polyurethane resin in addition to the above uses, it has been heretofore investigated that a silicone is added to the polyurethane resin to modify this resin, thereby imparting characteristics such as mold release properties, sliding properties and water repellency to the polyurethane resin.

As techniques for modifying the polyurethane resin with the silicone, there are known (a) a method which comprises reacting a mixture of a dimethyl silicone oil and a polymer having a hydroxyl group with a resin containing an isocyanate to prepare a silicone oil-modified polyurethane resin (Japanese Patent Publication No. 470/1988 and Japanese Patent Application Laid-open No. 176639/1986), (b) a method which comprises copolymerizing a monomer having a hydroxyl group, a monomer having an isocyanate group and a dimethylsilcone having a polymerizable functional group to prepare a silicone-modified polyurethane resin (Japanese Patent Application Laid-open Nos. 249821/1989 and 238315/1985), (c) a method which comprises grafting a reactive silicone having a functional group such as an isocyanate group which can easily react with a hydroxyl group, on the hydroxyl group present in the polyurethane resin to prepare a silicone-modified polyurethane resin (Japanese Patent Application Laid-open No. 116390/1994).

However, according to the method (a) just described, compatibility between the dimethylsiloxane and the other components is low, and for this reason, when this modified polyurethane resin is used for coating, there are some problems, and for example, the resulting coating film is opaque and the surface state of the film is not smooth. In addition, even if the compatibility can be improved, the silicone oil bleeds out from the coating film with the lapse of time, because the silicone oil does not chemically bond to the polyurethane resin. In consequence, the desired object cannot be achieved inconveniently.

Furthermore, in the case of the above method (b) in which the silicone oil is introduced into the main chain of the resin by the copolymerization, the mechanical strength of the obtained polyurethane resin is impaired on occasion.

Additionally, in the above graft method (c), the functional group utilizable in the reaction among functional groups in the obtained polyurethane resin is the hydroxyl group alone which is less reactive, and therefore it is difficult to use the resin in further other uses by a chemical modification using this hydroxyl group. Moreover, some reaction steps increase, so that the preparation method is an inconvenient complex.

On the other hand, the resins having the hydroxyl group in a molecule inclusive of the above-mentioned polyurethane resin are usually excellent in flexibility, adhesive properties, coating film formability, the dispersibility of a pigment and the like, and therefore they are often used as binders for coating compositions, ink bases, adhesives, coating materials and the like. Heretofore, for the purpose of imparting mold release properties, sliding properties, water repellency and the like in addition to the above characteristics of the resins having the hydroxyl group, it has been investigated to add the silicone to the resin having the hydroxyl group (Japanese Patent Application Laid-open No. 11117/1989).

However, when a silicone such as a dimethylsiloxane is added to the resin having the hydroxyl group and this resin containing the silicone is used for coating, the resulting coating film is opaque and the surface state of the film is not smooth, because the compatibility between the silicone and the resin is low. In addition, even if the compatibility can be improved, the silicone bleeds out from the resin having the hydroxyl group with the lapse of time, because the silicone does not chemically bond to the above resin. In consequence, the above object cannot be achieved inconveniently.

In order to solve the above problems and to maintain the effect of the added silicone, it has also been suggested to chemically modify the resin having the hydroxyl group with the silicone (Japanese Patent Application Laid-open No. 11117/1989). That is to say, a reactive silicone having an organic functional group such as a carboxyl group or an epoxy group which can react with the hydroxyl group is grafted on the hydroxyl group in the resin. However, this method is not practical, because the reactivity of the silicone is low, and so a large amount of the unreacted silicone remains in a reaction mixture.

SUMMARY OF THE INVENTION

The present inventor has intensively investigated on a silicone-modified polyurethane resin utilizable in new uses by imparting various preferable characteristics to a polyurethane resin with the intention of solving the above various problems. As a result, it has been found that a polyurethane resin derivative, which is obtained by reacting a polydimethylsiloxane having a specific chemical structure with a polyisocyanate having a specific chemical structure, has an isocyanate group in a main chain, and the resin can be employed for various preferable uses by the utilization of this isocyanate group in the main chain and can solve the above problems.

Furthermore, the present inventor has found that when a polyurethane resin derivative having a polydimethylsiloxane side chain and an isocyanate group is reacted with a hydroxyl group-containing resin, they copolymerize, so that the polydimethylsiloxane can be introduced into the hydroxyl group-containing resin. It has also been understood that the thus obtained coating resin composition can easily react with the polyisocyanate to form a coating film which is excellent in water repellency, mold release properties, sliding properties and the like.

The present invention has now been completed on the basis of these knowledges. Therefore, an object of the present invention is to provide a polyurethane resin derivative which has a polydimethylsiloxane and a highly reactive isocyanate group in the main chain of a polyurethane resin obtained by one step reaction and in which various chemical modifications are possible by the use of this isocyanate group and self crosslinking is also possible.

Another object of the present invention is to provide a coating resin composition by which the above problems can be solved.

Still another object of the present invention is to provide a method for curing the coating resin composition.

That is to say, the first aspect of the present invention is directed to a polyurethane resin derivative having a polydimethylsiloxane side chain and an isocyanate group in a main chain of a polyurethane molecule which can be obtained by reacting (A) a polydimethylsiloxane having an alkyl group on one terminal and 2 hydroxyl groups in the vicinity of the other terminal with (B) a polyisocyanate having 2 or more isocyanate groups in one molecule.

The second aspect of the present invention is directed to a coating resin composition obtained by reacting a polyurethane resin derivative having a polydimethylsiloxane side chain and an isocyanate group in a main chain of a polyurethane molecule with a hydroxyl group-containing resin.

The third aspect of the present invention is directed to a method for curing a coating resin composition which comprises steps of adding a polyisocyanate having 2 or more isocyanate groups in one molecule to the coating resin composition to accomplish crosslinking.

The polyurethane resin derivative having a silicone side chain of the present invention can directly be synthesized from a polyisocyanate and an alcohol-modified dimethylsiloxane, and this reaction is so simple that it can be completed by one step. Furthermore, in the obtained polyurethane resin derivative, the silicone is chemically bonded as a side chain, and therefore, even when this resin derivative is used for a long period of time, it is so stable that the silicone does not bleed out. Moreover, since this polyurethane resin derivative has a highly reactive isocyanate group in a molecule, various chemical modification is possible by the utilization of this group. Accordingly, this polyurethane resin derivative can be utilized in various new uses. In addition, the polyurethane resin derivative has an isocyanate group, and hence self crosslinking is also possible. Accordingly, the polyurethane resin derivative can be utilized in various use applications such as a coating composition, a binder, an adhesive and a sealant, and so it is extremely useful.

The coating resin composition of the present invention can be prepared by reacting a polyurethane resin derivative having a polydimethylsiloxane side chain and an isocyanate group on a main chain of a polyurethane molecule with a hydroxyl group-containing resin. This reaction is so simple as to be industrially practical. Additionally, in this coating resin composition, the polydimethylsiloxane is chemically bonded. When this composition is used for coating, the polydimethylsiloxane does not bleed out for a long period of time and can exert good mold release properties, water repellency, sliding properties and the like.

DETAILED DESCRIPTION OF THE PREFERRED EMBODIMENTS

Polyurethane Resin Derivative

Figure 1:
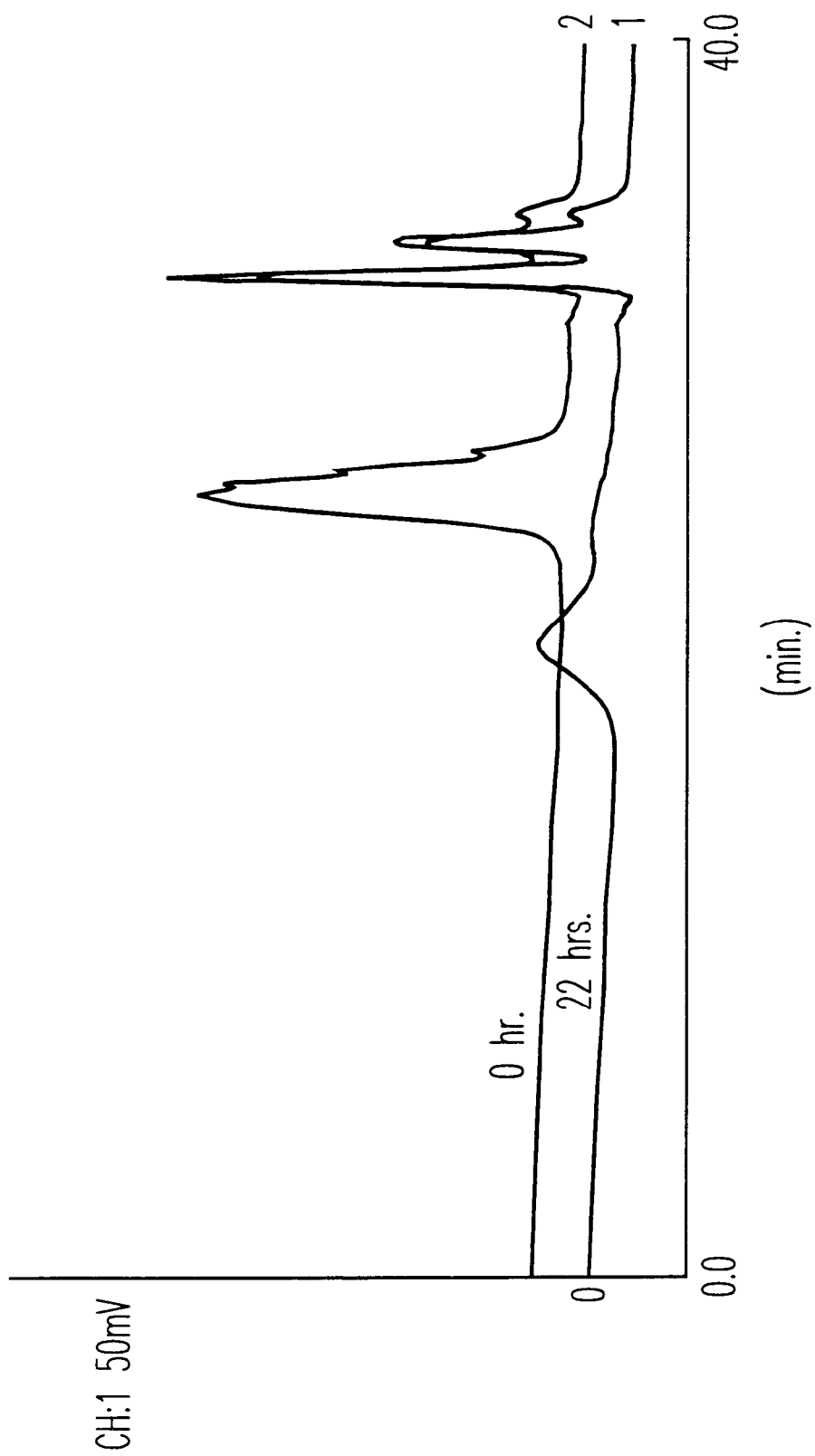
FIG. 1 is a GPC chart showing a change of an amount of an unreacted one terminal diol-modified silicone in a reaction solution with respect to time, in synthesizing a polyurethane resin derivative of the present invention in Example 1.

The chemical structure of a polyurethane resin derivative according to the present invention mainly comprises a main chain comprising a polyurethane molecule, a polydimethylsiloxane side chain bonded to the main chain, and an isocyanate group bonded to the main chain.

The above polyurethane resin derivative can be prepared by reacting (A) a polydimethylsiloxane having an alkyl group on one terminal and 2 hydroxyl groups in the vicinity of the other terminal with (B) a polyisocyanate having 2 or more isocyanate groups in one molecule.

The thus prepared polyurethane resin derivative of the present invention has the highly reactive isocyanate groups in the molecule. These isocyanate groups can be reacted with any of compounds having various functional groups to modify the polyurethane resin derivative. Therefore, specific characteristics by this modification can be added to the characteristics of the silicone and the polyurethane which the polyurethane resin derivative of the present invention has originally. In consequence, the polyurethane resin derivative can be utilized in more uses.

Furthermore, in the polyurethane resin derivative of the present invention, self crosslinking is singly possible, and therefore the polyurethane resin derivative can suitably be used as a coating composition, a sealant, a binder, an adhesive and the like.

As the polydimethylsiloxane (A) having the alkyl group on one terminal and the 2 hydroxyl groups on the other terminal, a compound represented by the general formula (1) is preferable:

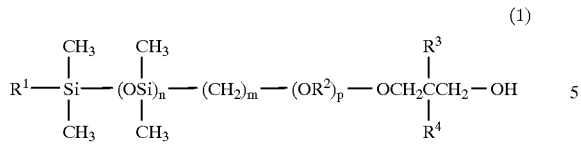

(1)

In the general formula (1), $R^1$ is an alkyl group having 1 to 4 carbon atoms such as a methyl group, an ethyl group, a propyl group or a butyl group, and above all, the butyl group is particularly preferable.

$R^2$ is an ethylene group or a propylene group, and above all, the ethylene group is particularly preferable.

$R^3$ is a hydrogen atom, a methyl group or an ethyl group, and above all, the hydrogen atom is particularly preferable.

$R^4$ is a hydroxyl group or a methylhydroxyl group, and above all, the methylhydroxyl group is preferable.

n is an integer of 0 to 100, p is an integer of 0 to 100, and m is an integer of 2 to 9.

Typical examples of the polydimethylsiloxane (A) include

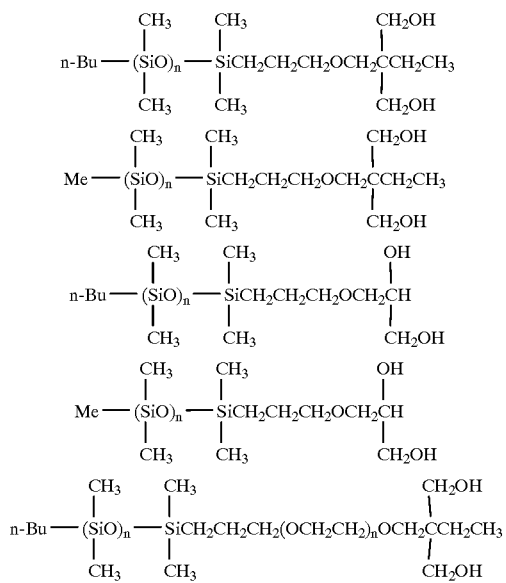

As the polyisocyanate (B) having the 2 or more isocyanate groups in one molecule, a compound represented by the general formula (2) is preferable:

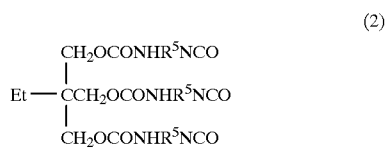

(2)

wherein Et is an ethyl group; and $R^5$ is $-(CH_2)_6-$, or

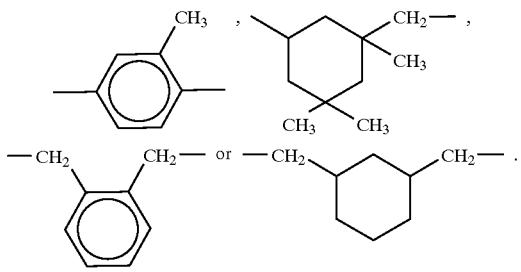

In the present invention, the above polydimethylsiloxane (A) is reacted with the above polyisocyanate (B) to prepare the polyurethane resin derivative of the present invention. A blend ratio between the components (A) and (B) is such that the isocyanate group of the polyisocyanate (B) is in the range of 1.05 to 15 equivalents with respect to the hydroxyl group of the polydimethylsiloxane (A).

The polyurethane resin derivative prepared by reacting the polydimethylsiloxane of the general formula (1) with the polyisocyanate of the general formula (2) is particularly preferable in the present invention. In this reaction, the reaction of the polydimethylsiloxane of the general formula (1) with the polyisocyanate of the general formula (2) is preferably carried out in a molar ratio of 1.4:1 to 1:10.

If the molar ratio of the polydimethylsiloxane of the general formula (1) is more than the above ratio range, the remaining isocyanate group in the polyurethane resin derivative decreases, so that a functional effect which is intended by the present invention declines. In the above reaction, all of the hydroxyl group cannot always completely react with all of the isocyanate group. Therefore, even when an excessive equivalent of the hydroxyl group is blended, the unreacted isocyanate group remains in the produced polyurethane resin derivative molecule.

Furthermore, if the molar ratio of the polyisocyanate of the general formula (2) is in excess of the above range, the unreacted polyisocyanate of the general formula (2) remains in large quantities. In such a case as a large amount of the remaining polyisocyanate has a bad influence, the molar ratio of the polyisocyanate is preferably 1:3 or less.

In preparing the polyurethane resin derivative of the present invention, it is not necessary to use specific reaction devices and conditions.

In the above reaction, the employment of a solvent is preferable. Examples of the solvent to be used include esters such as methyl acetate, butyl acetate and ethyl acetate, ketones such as acetone and methyl ethyl ketone, aromatic hydrocarbons such as toluene and xylene, and ethers such as diethyl ether, dibutyl ether, tetrahydrofuran and dioxane. They can be used singly or in the form of a mixture two or more thereof.

The employment of a catalyst is optional. As the catalyst to be used, known catalysts which are usually used in the preparation of urethane resins can be used singly or in a combination of two or more thereof. Typical examples of the catalysts include organic tin compounds such as dibutyltin dilaurate and tin dioctoate, and tertiary amines such as triethylamine, N-ethyl morpholine and 1,8-diazabicyclo [5.4.0]undecene-7.

The amount of the catalyst to be used is in the range of 0.001 to 20% by weight, preferably 0.01 to 1.0% by weight with respect to the polyurethane resin derivative.

A reaction temperature is preferably in the range of room temperature to 150° C., more preferably 50 to 120° C. A reaction time depends on the presence/absence of the catalyst. The reaction usually finishes in a period of 1 to 20 hours.

In the present invention, the polyurethane resin derivative is directly synthesized from the polyisocyanate and the polydimethylsiloxane (an alcohol-modified dimethylsiloxane), and hence, in this reaction, any hydroxyl group-containing resin is not used. Furthermore, the obtained polyurethane resin derivative contains the highly active isocyanate group and the dimethylsiloxane as the side chain of the molecule. Additionally, in the polyurethane resin derivative of the present invention, a chemical modification is possible and self crosslinking is also possible.

In the case that the polyurethane resin derivative is further modified by the utilization of this isocyanate group, any compound having a functional group which can react with the isocyanate group can be used as a compound for the modification. Examples of the compound for the modification include compounds having an active hydrogen group such as alcohols, carboxylic acids, amines, urea and urethanes.

Coating Resin Composition

A coating resin composition of the present invention can be obtained by reacting the polyurethane resin derivative having the polydimethylsiloxane side chain and the isocyanate group on the main chain of the polyurethane molecule with the hydroxyl group-containing resin.

The chemical structure of the above polyurethane resin derivative is mainly constituted of the main chain comprising the polyurethane molecule, the polydimethylsiloxane side chain bonded to the main chain and the isocyanate group bonded to the main chain. This polyurethane resin derivative can be prepared by, for example, the above method which comprises reacting the polydimethylsiloxane (A) having the alkyl group on one terminal and the 2 hydroxyl groups on the other terminal with the polyisocyanate (B) having 3 or more isocyanate groups in one molecule, but this method is not restrictive. Thus, the polyurethane resin derivative obtained by any method can be used.

In the present invention, the polyurethane resin derivative obtained by the above method or a method other than the above method is reacted with the hydroxyl group-containing resin to obtain the coating resin composition of the present invention.

As the hydroxyl group-containing resin which can be reacted with the polyurethane resin derivative, any resin can be used, so long as it has 1 or more hydroxyl groups in one molecule. The hydroxyl group-containing resin having one hydroxyl group in one molecule is different from the hydroxyl group-containing resin having 2 or more hydroxyl groups in one molecule, because these resins will produce the coating resins having different characteristics, respectively, as described hereinafter. In the present invention, both of the above hydroxyl group-containing resins are important.

Particularly preferable examples of the hydroxyl group-containing resin having one hydroxyl group in one molecule include compounds represented by the general formulae:

Here, $R^6$ is any of hydrocarbon groups such as alkyl groups having 1 to 18 carbon atoms, a phenyl group and cycloalkyl groups as well as functional groups having an unsaturated bond such as vinyl, allyl and methacryl. Any of these groups is acceptable, so long as it is industrially easily available. Polyoxyethylenes such as methyl, ethyl, propyl, vinyl and allyl in which the number of carbon atoms of $R^6$ is relatively small are preferable because of having a high compatible effect described hereinafter. Furthermore, q is preferably in the range of about 1 to 500, but it is more preferably in the range of about 10 to 200 from the viewpoint of the compatibility.

The coating resin composition of the present invention, which can be obtained by reacting the polyurethane resin derivative with a hydroxyl group-containing resin such as the polyoxyalkylene having one hydroxyl group in one molecule, is mixed with a hydroxyl group-containing resin for a coating composition when used, as described below. This coating resin composition can be obtained by reacting the polyurethane resin derivative with the polyoxyalkylene in such a ratio as to consume 10% or more, preferably 100% of the isocyanate group bonded to the polyurethane resin derivative.

The thus obtained coating resin composition is highly compatible with hydroxyl group-containing resins for coating compositions such as fluorine-containing polyols, polyoxyalkylenes, polyvinyl alcohols, acrylpolyols, polyesterpolyols and polyurethanepolyols. Therefore, when the coating resin composition obtained by reacting the polyurethane resin derivative with a hydroxyl group-containing resin such as the above polyoxyalkylene having one hydroxyl group in one molecule is merely mixed with the resin solution for the coating composition, a transparent solution can be prepared. This solution is preferable as the coating resin composition of the present invention. To this solution, the polyisocyanate can be added as a curing agent, followed by heating, to obtain a silicone-modified coating film which is excellent in transparency.

In this case, a compound which crosslinks with the polyisocyanate is the mixed hydroxyl group-containing resin for the coating composition. However, the coating resin composition obtained by reacting the polyurethane resin derivative with the hydroxyl group-containing resin having one hydroxyl group in one molecule is extremely compatible with the hydroxyl group-containing resin for the coating composition. Therefore, the coating film obtained in this case does not give rise to the bleed-out of the silicone.

On the other hand, the hydroxyl group-containing resin having 2 or more hydroxyl groups preferably has a hydroxyl value of about 10 to 400, particularly preferably about 15 to 250. In this case, the hydroxyl value of the hydroxyl group-containing resin usually means a hydroxyl value of its solution prepared by dissolving the resin in a solvent. The viscosity of the hydroxyl group-containing resin is preferably in the range of 0.85 to 23 stokes (25° C.) (which correspond to ranks of C to Z of a Gardner viscosity). If the viscosity is too high, the hydroxyl group-containing resin can be diluted prior to the use. In a coating step, it is preferable to use the hydroxyl group-containing resin in which the viscosity has been adjusted to the range of 1.4 to 9 stokes (25° C.) (which correspond to ranks of F to V of the Gardner viscosity).

Typical examples of the hydroxyl group-containing resin for the coating composition include acrylpolyols such as Acrydic A-801 and A-814 made by Dainippon Ink & Chemicals, Inc., Takeluck UA-702 and UA-902 made by Takeda Chemical Industries, Ltd., and Hitaloid 3008 and 3004 made by Hitachi Chemical Co., Ltd.

Furthermore, typical examples of the polyesterpolyols include Takeluck U-24 and U-27 made by Takeda Chemical Industries, Ltd.

Typical examples of the fluorine-containing polyols include Lumifuron LF-400 and LF-600 made by Asahi Glass Co., Ltd.

In addition, usable examples include polyoxyalkylenes such as polyethylene glycol and polypropylene glycol, polyvinyl alcohols and polyurethanepolyols.

A blend ratio between the hydroxyl group-containing resin having 2 or more hydroxyl groups and the polyurethane resin derivative in the reaction thereof is preferably such that the ratio of the isocyanate group in the polyurethane resin derivative is 10 mol % or less with respect to the hydroxyl group in the hydroxyl group-containing resin. In the polyurethane resin derivative, a plurality of the isocyanate groups are present, and therefore, if the ratio is in excess of 10 mol %, the coating resin composition is liable to gel during the reaction or during its storage. Furthermore, if the above ratio is less than 0.1 mol %, the ratio of the polydimethylsiloxane which is incorporated into the hydroxyl group-containing resin is low, so that characteristics such as water repellency decline. Therefore, the above ratio is preferably in the range of 10 to 0.1 mol %.

The reaction of the polyurethane resin derivative with the hydroxyl group-containing resin having 1, 2 or more hydroxyl groups in one molecule can be carried out by the use of a reactor and conditions well known by a person skilled in the art without using a particular reaction device and particular reaction conditions.

In carrying out the reaction, it is preferable to use a solvent. Examples of the solvent to be used include esters such as methyl acetate, ethyl acetate and butyl acetate, ketones such as acetone and methyl ethyl ketone, aromatic hydrocarbons such as toluene and xylene, and ethers such as diethyl ether, dibutyl ether, tetrahydrofuran and dioxane. They can be used singly or in the form of a mixture two or more thereof.

The employment of a catalyst is optional. As the catalyst to be used, known catalysts which are usually used in the preparation of urethane resins are preferable. Examples of the catalysts include organic tin compounds such as dibutyltin dilaurate and tin dioctoate, and tertiary amines such as triethylamine, N-ethyl morpholine and 1,8-diazabicyclo [5.4.0]undecene-7. These catalysts may be used singly or in a combination of two or more thereof. The amount of the catalyst to be used is in the range of 0.001 to 20% by weight, preferably 0.01 to 1.0% by weight with respect to the polyurethane resin derivative.

A reaction temperature is preferably in the range of room temperature to 150° C., more preferably 50 to 120° C.

A reaction time depends on the presence/absence of the catalyst, but the reaction usually finishes in a period of 1 to 20 hours.

The coating resin composition of the present invention obtained by reacting the polyurethane resin derivative with the hydroxyl group-containing resin can be cured by using a polyisocyanate having 2 or more isocyanate groups in one molecule as a curing agent.

Examples of the curing agent include diisocyanates such as 2,4-tolylene diisocyanate, 2,6-tolylene diisocyanate, m-phenylene diisocyanate, p-phenylene diisocyanate and 4,4'-diphenylmethane diisocyanate which are usually used in the known polyurethane resins, adducts of these organic isocyanates and other compounds, for example, polyisocyanates of the general formula (2), but they are not restrictive.

A blend ratio between the coating resin composition of the present invention and the curing agent is such that the isocyanate group in the curing agent is in the range of 0.3 to 2.0 equivalents with respect to the hydroxyl group in the coating resin composition.

In order to cure this coating resin composition with the curing agent, usual curing conditions in a urethane coating step are acceptable. Typically, even when the coating resin composition is allowed to stand for several days in the atmosphere or at a controlled humidity, it can be cured. Furthermore, when the coating resin composition is heated at about 50 to 150° C., it can be cured in a period of several minutes to several hours. These curing conditions depend on the usage of the coating resin composition, and when it is applied to the outer wall of a building, it can be cured at an outside temperature. When applied to a steel plate, the coating resin composition is heated at about 100° C. for 1 to 2 minutes in a steel plate application line to cure it.

The coating resin composition of the present invention may be mixed with the curing agent, applied to the surface of a selected object as it is, and then heated to cure it. These steps permit the formation of a coating film having preferable characteristics such as water repellency, release properties and sliding properties on the surface of the object.

Furthermore, the coating resin composition of the present invention can also be blended with a pigment or a dye, a filler and the like, and then utilized as a coating composition.

Next, the present invention will be described in detail with respect to examples.

EXAMPLE 1

In a 100 ml flask were placed 13.9 g (0.02 mol as a hydroxyl group) of one terminal diol-modified silicone having a hydroxyl group equivalent of 670 represented by the following general formula (3)

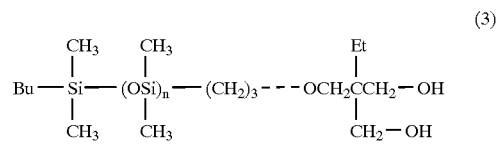

10.0 g (0.03 mol as an isocyanate) of a polyisocyanate (Takenate D160N, made by Takeda Chemical Industries, Ltd.) having an NCO equivalent of 333.3 and a solid concentration of 75% by weight represented by the formula (4)

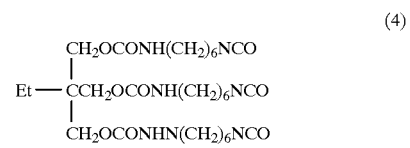

and 40 g of toluene, and the mixture was then heated and stirred at 80° C. for 22 hours.

FIG. 1 shows a GPC (gel permeation chromatography, eluent=toluene) chart at heating and stirring times of 0 and 22 hours. It could be confirmed from the chart in FIG. 1 that substantially all of the silicone was consumed after 22 hours and a polymer was formed.

Figure 2:
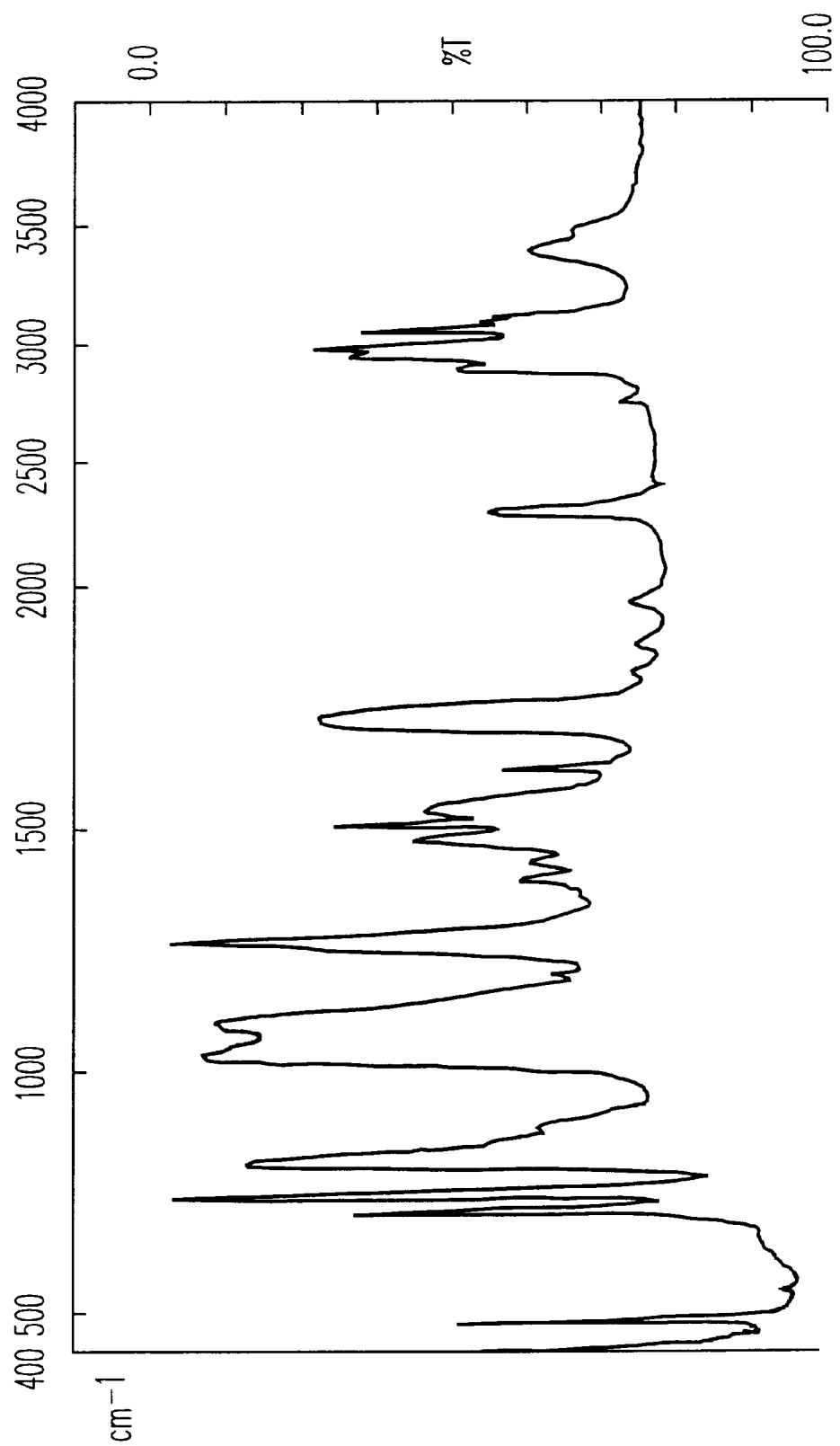
FIG. 2 is an IR chart of a reaction product at a time when 22 hours have passed from the start of a reaction in Example 1.

FIG. 2 shows an IR chart of a reaction composition after a heating and stirring operation for 22 hours. It could be confirmed from the IR chart that the isocyanate and dimethyl silicone were contained in the reaction composition. From these analytical results, it could be confirmed that the composition obtained by this reaction was a polyurethane resin represented by the general formula (5):

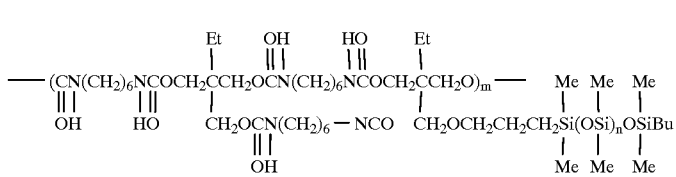

(5)

EXAMPLE 2

In a 100 ml flask were placed 13.9 g (0.02 mol as a hydroxyl group) of one terminal diol-modified silicone having a hydroxyl group equivalent of 670 represented by the above general formula (3), 13.3 g (0.04 mol as an isocyanate) of a polyisocyanate (Takenate D160N, made by Takeda Chemical Industries, Ltd.) and 0.2 g of a 1 wt % toluene solution of dibutyltin dilaurate, and the mixture was then heated and stirred at 80° C. for 3 hours.

Figure 3:
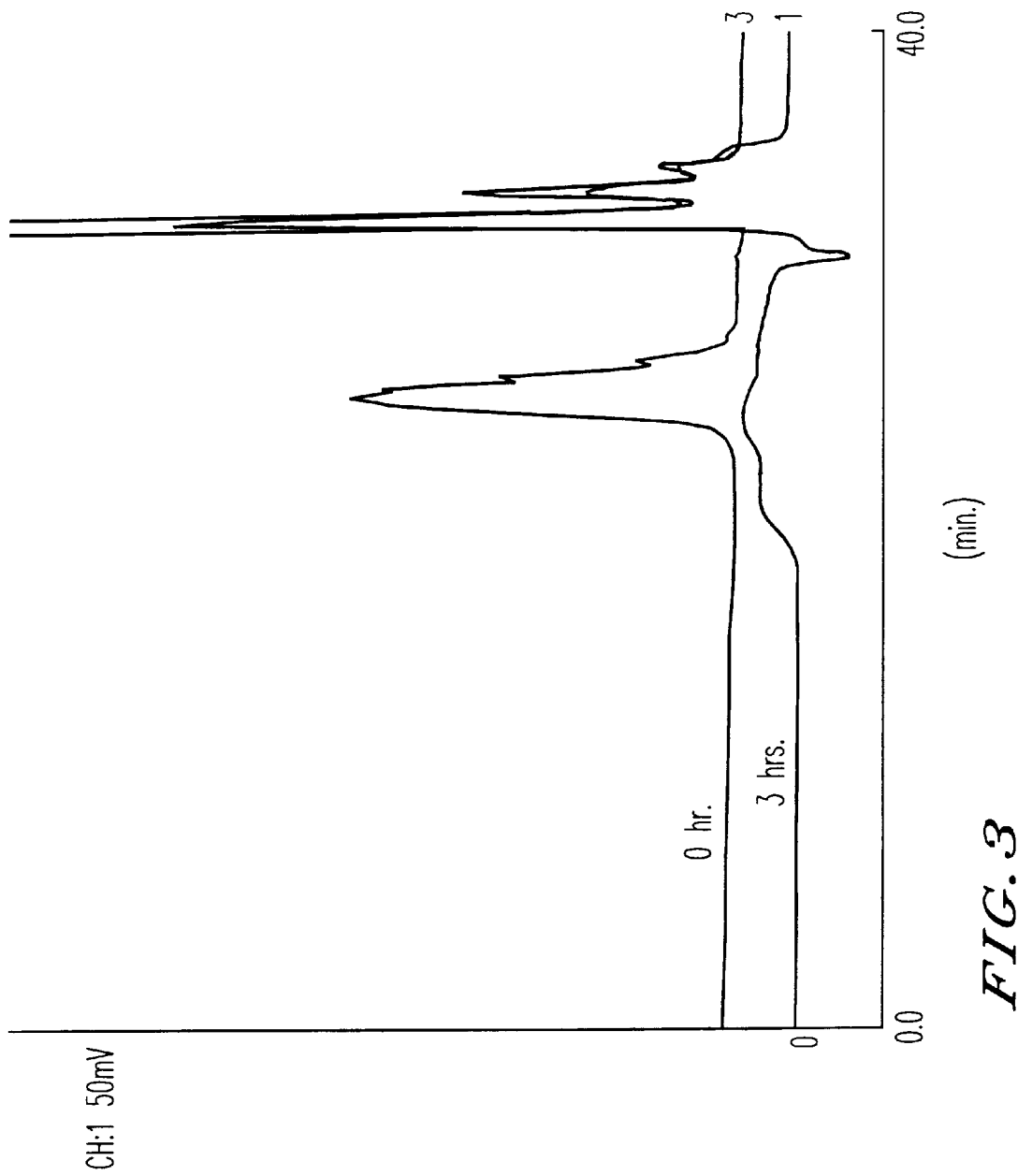
FIG. 3 is a GPC chart showing a change of an amount of an unreacted one terminal diol-modified silicone in a reaction solution with respect to time, in synthesizing a polyurethane resin derivative of the present invention in Example 2.

FIG. 3 shows a GPC (eluent=toluene) chart at heating and stirring times of 0 and 3 hours. It could be confirmed from the chart in FIG. 3 that substantially all of the silicone was consumed.

Figure 4:
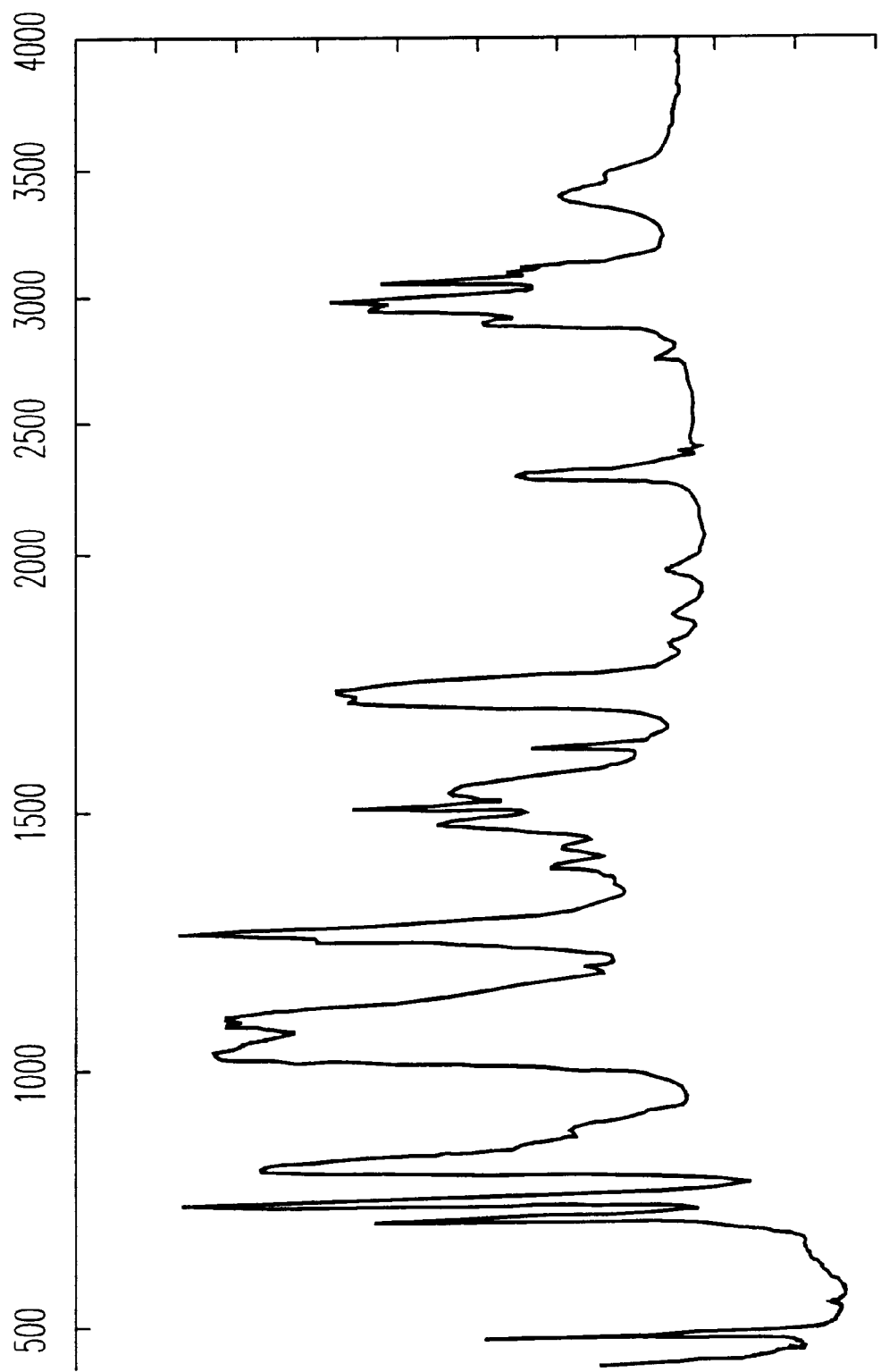
FIG. 4 is an IR chart of a reaction product at a time when 3 hours have passed from the start of a reaction in Example 2.

FIG. 4 shows an IR chart of a reaction composition after a heating and stirring operation for 3 hours. It could be confirmed from the IR chart in FIG. 4 that the isocyanate and dimethyl silicone were contained in the obtained composition.

EXAMPLE 3

In a 200 ml flask were placed 15.09 g (0.007 mol as a hydroxyl group) of one terminal diol-modified silicone having a hydroxyl group equivalent of 2130 represented by the above general formula (3), 3.5 g (0.01 mol as an isocyanate) of a polyisocyanate (Takenate D160N, made by Takeda Chemical Industries, Ltd.), 35 g of toluene and 0.2 g of a 1 wt % toluene solution of dibutyltin dilaurate, and the mixture was then heated and stirred at 80° C. for 3 hours.

Figure 5:
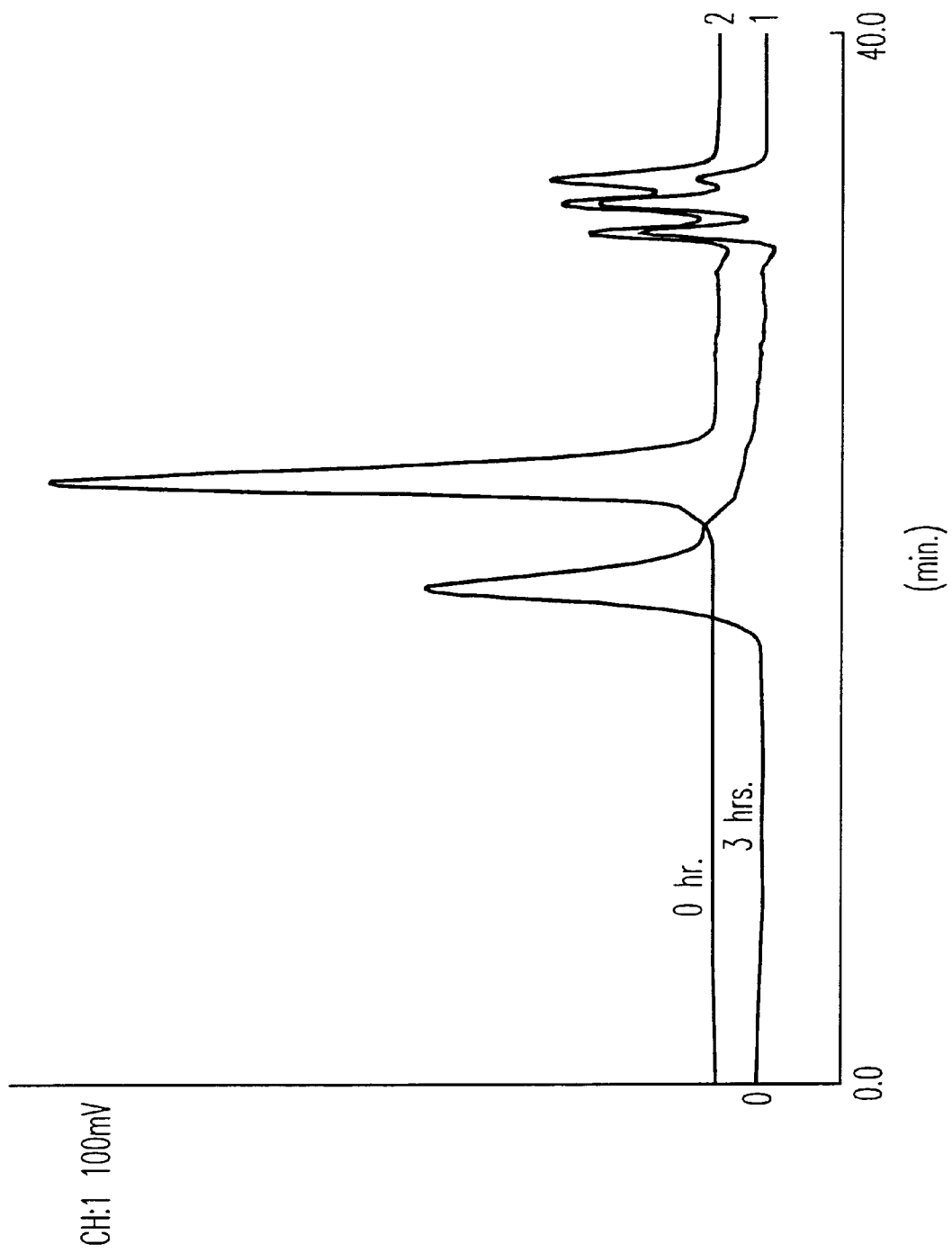
FIG. 5 is a GPC chart showing a change of an amount of an unreacted one terminal diol-modified silicone in a reaction solution with respect to time, in synthesizing a polyurethane resin derivative of the present invention in Example 3.
Figure 6:
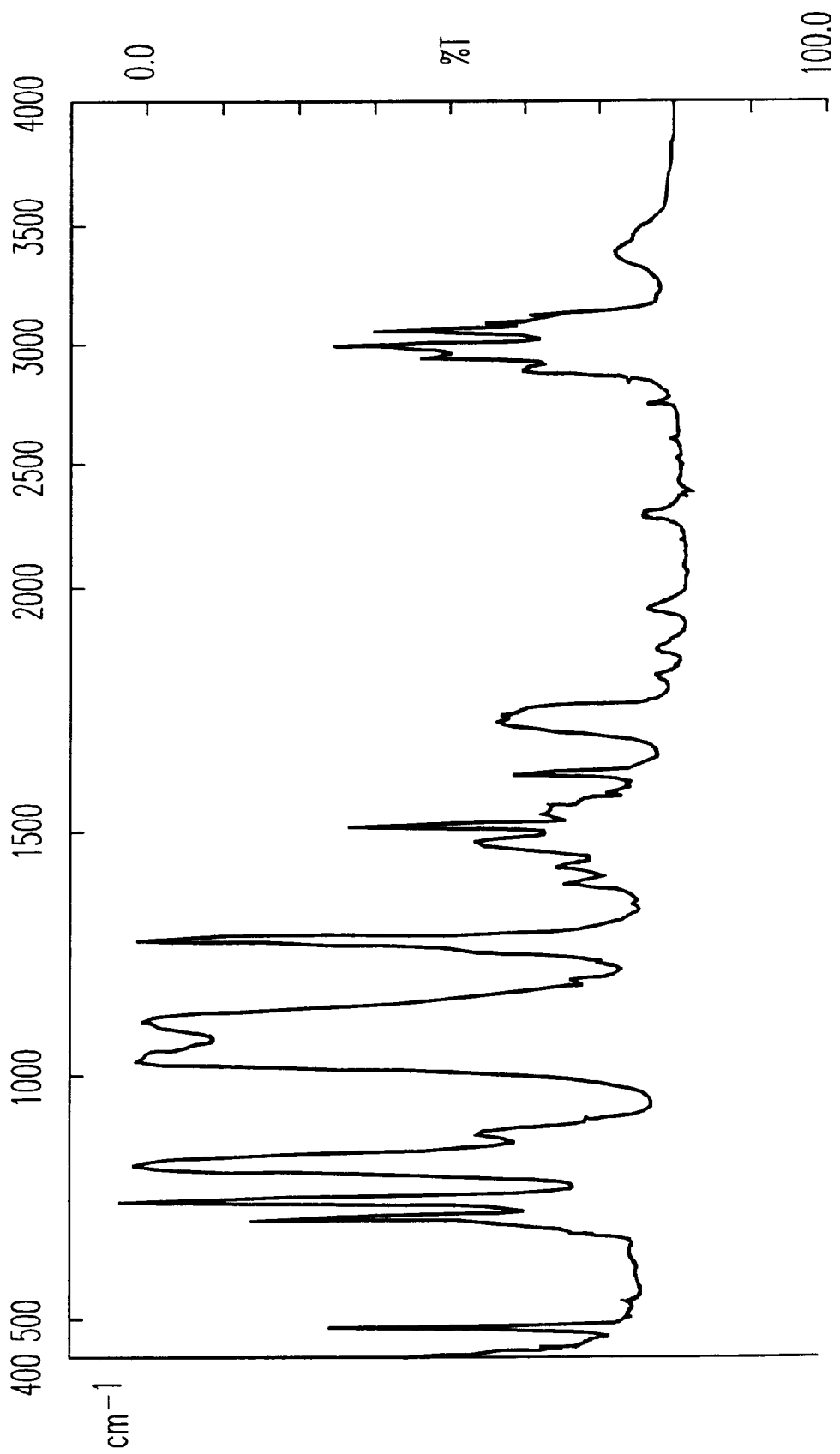
FIG. 6 is an IR chart of a reaction product at a time when 4 hours have passed from the start of a reaction in Example 3.

FIG. 5 shows a GPC (eluent=toluene) chart at heating and stirring times of 0 and 3 hours. It could be confirmed from FIG. 5 that substantially all of the silicone was consumed at a heating and stirring time of 3 hours. FIG. 6 shows an IR chart of a reaction composition after a heating and stirring operation for 4 hours. It could be confirmed from the IR chart in FIG. 6 that the isocyanate was contained in the reaction product obtained by the reaction.

Cure Test Example 1

A polyurethane resin derivative synthesized in Example 1 was applied onto a glass plate having a thickness of 15 μm, and then allowed to stand at room temperature for 2 days. Afterward, this glass plate was immersed in toluene, and at this time, a film-like material which was not dissolved in toluene was observed. From this fact, it could be confirmed that self crosslinking proceeded in the atmosphere.

EXAMPLE 4

In a 100 ml flask were placed 15.0 g (0.0067 mol as a hydroxyl group) of one terminal diol-modified silicone having a hydroxyl group equivalent of 2240 represented by the above general formula (3), 3.4 g (0.01 mol as an isocyanate) of a polyisocyanate (Takenate D160N, made by Takeda Chemical Industries, Ltd.), 40 g of toluene and 0.2 g of a 1 wt % toluene solution of dibutyltin dilaurate, and the mixture was then heated and stirred at 80° C. for 4 hours.

Figure 7:
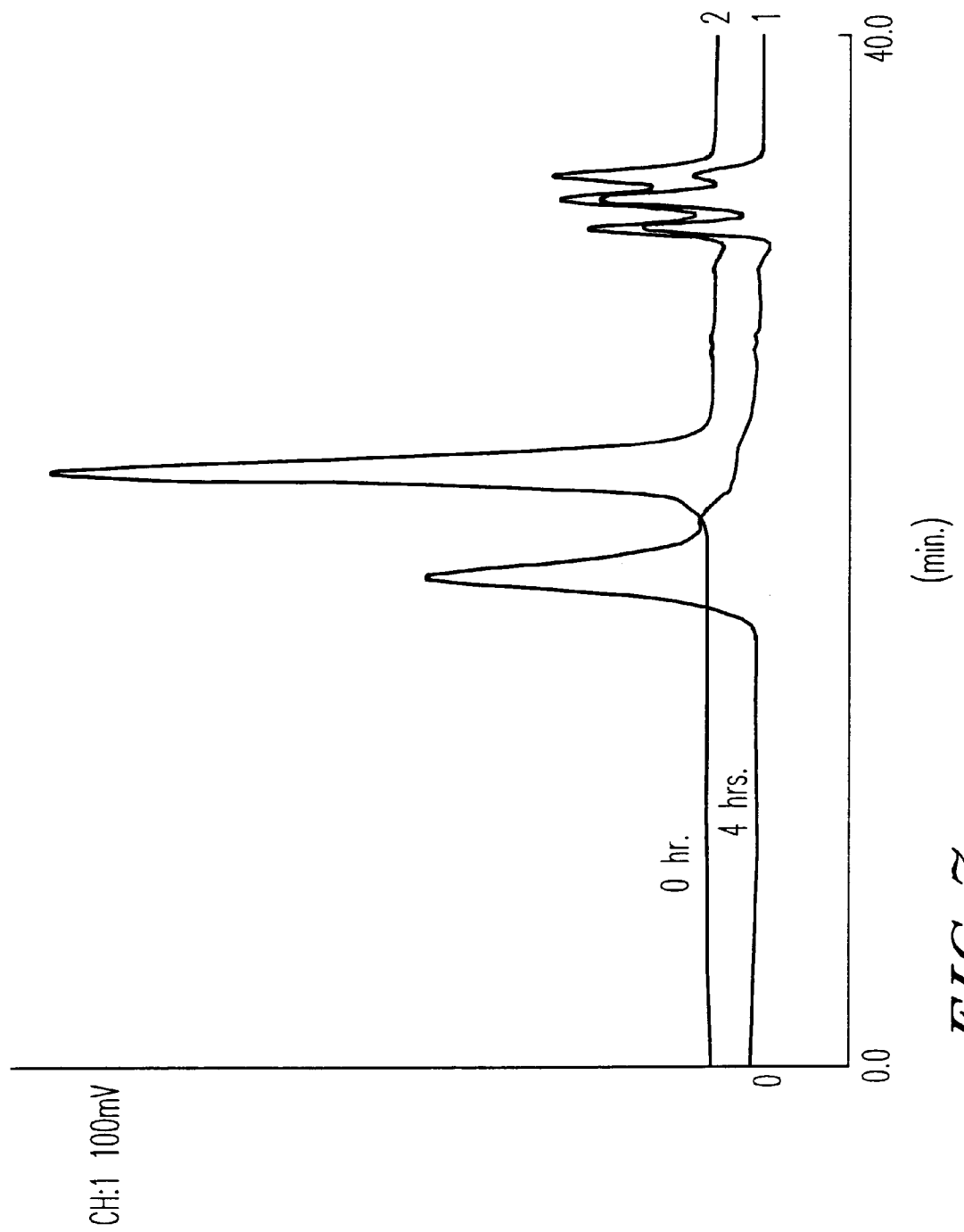
FIG. 7 is a GPC chart showing a change of an amount of an unreacted one terminal diol-modified silicone with respect to time in Example 4.

FIG. 7 shows a GPC (eluent=toluene) chart at heating and stirring times of 0 and 4 hours. It could be confirmed from FIG. 7 that substantially all of the silicone was consumed at a heating and stirring time of 4 hours.

Figure 8:
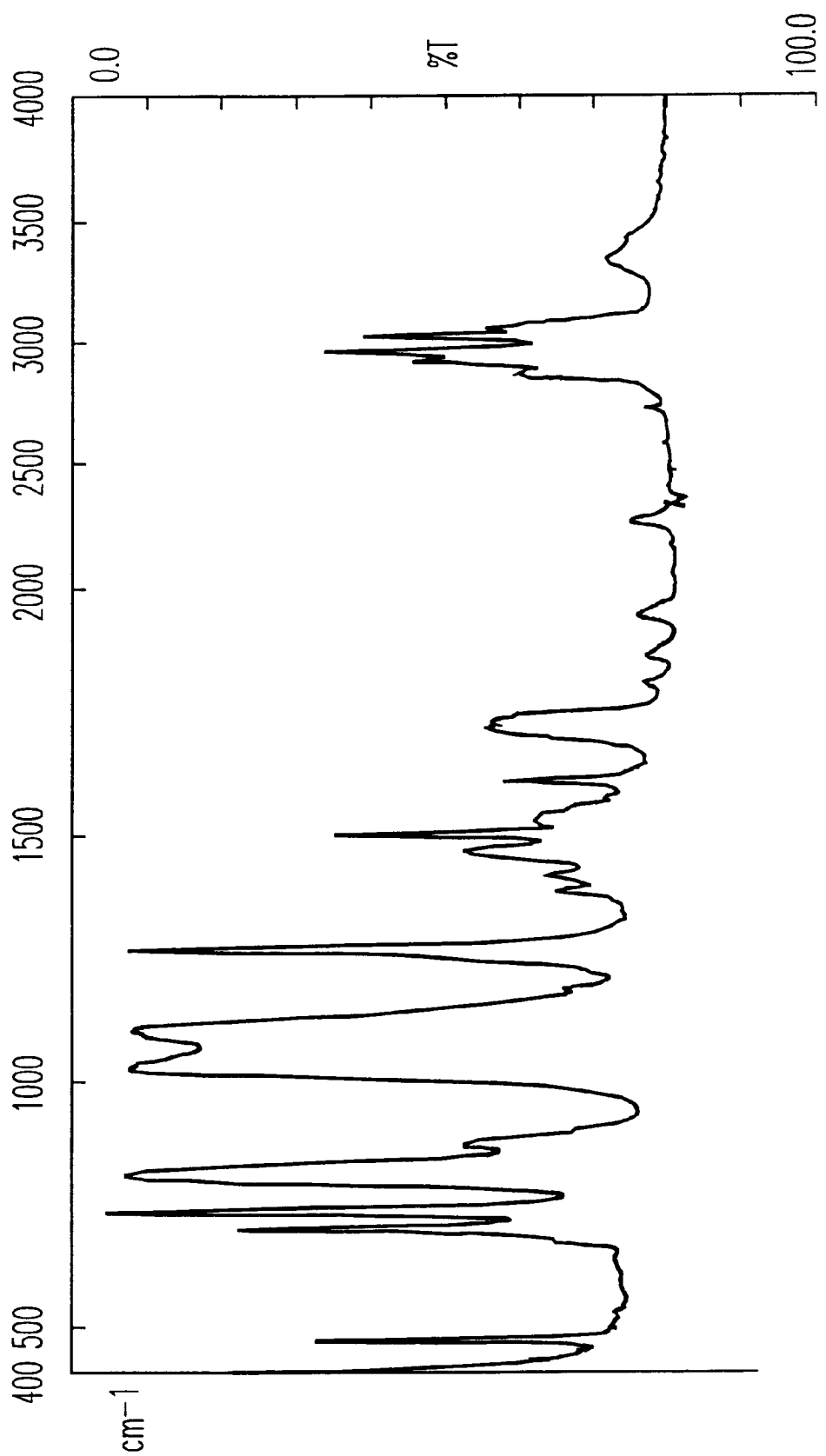
FIG. 8 is an IR chart of a reaction product at a time when 4 hours have passed from the start of a reaction in Example 4.

FIG. 8 shows an IR chart of a reaction product after a heating and stirring operation for 4 hours. It could be confirmed from the IR chart in FIG. 8 that the isocyanate was contained in the reaction product obtained by the reaction.

EXAMPLE 5

In a flask were placed 0.32 g (0.005 mol as a hydroxyl group) of one terminal diol-modified silicone having a hydroxyl group equivalent of 670, 3.2 g (0.08 mol as an isocyanate) of a polyisocyanate (Takenate D140N, made by Takeda Chemical Industries, Ltd.) having an NCO equivalent of 400 and a solid concentration of 75 wt %, 6.5 g of toluene and 4 g of xylene, and the mixture was then heated and stirred at 80° C. for 1 hour to obtain a polyurethane resin derivative.

EXAMPLE 6

In a 50 ml flask were placed 0.34 g (0.00005 mol as a hydroxyl group) of one terminal diol-modified silicone having a hydroxyl group equivalent of 6040, 3.2 g (0.08 mol as an isocyanate) of a polyisocyanate (Takenate D140N, made by Takeda Chemical Industries, Ltd.) having an NCO equivalent of 400 and a solid concentration of 75 wt %, 6.5 g of toluene and 4 g of xylene, and the mixture was then heated and stirred at 80° C. for 1 hour to obtain a polyurethane resin derivative.

EXAMPLE 7

In a 100 ml flask were placed 13.9 g (0.02 mol as a hydroxyl group) of one terminal diol-modified silicone having a hydroxyl group equivalent of 670 represented by the above general formula (3), 13.3 g (0.04 mol as an isocyanate) of a polyisocyanate (Takenate D160N), 51 g of toluene and 0.2 g of a 1 wt % toluene solution of dibutyltin dilaurate, and the mixture was then heated and stirred at 80° C. for 3 hours.

From GPC (eluent=toluene) after 3 hours and measured results by IR, it could be confirmed that substantially all of the silicone was consumed at a heating and stirring time of 3 hours and the isocyanate and dimethyl silicone were contained in the obtained reaction product.

EXAMPLE 8

Figure 9:
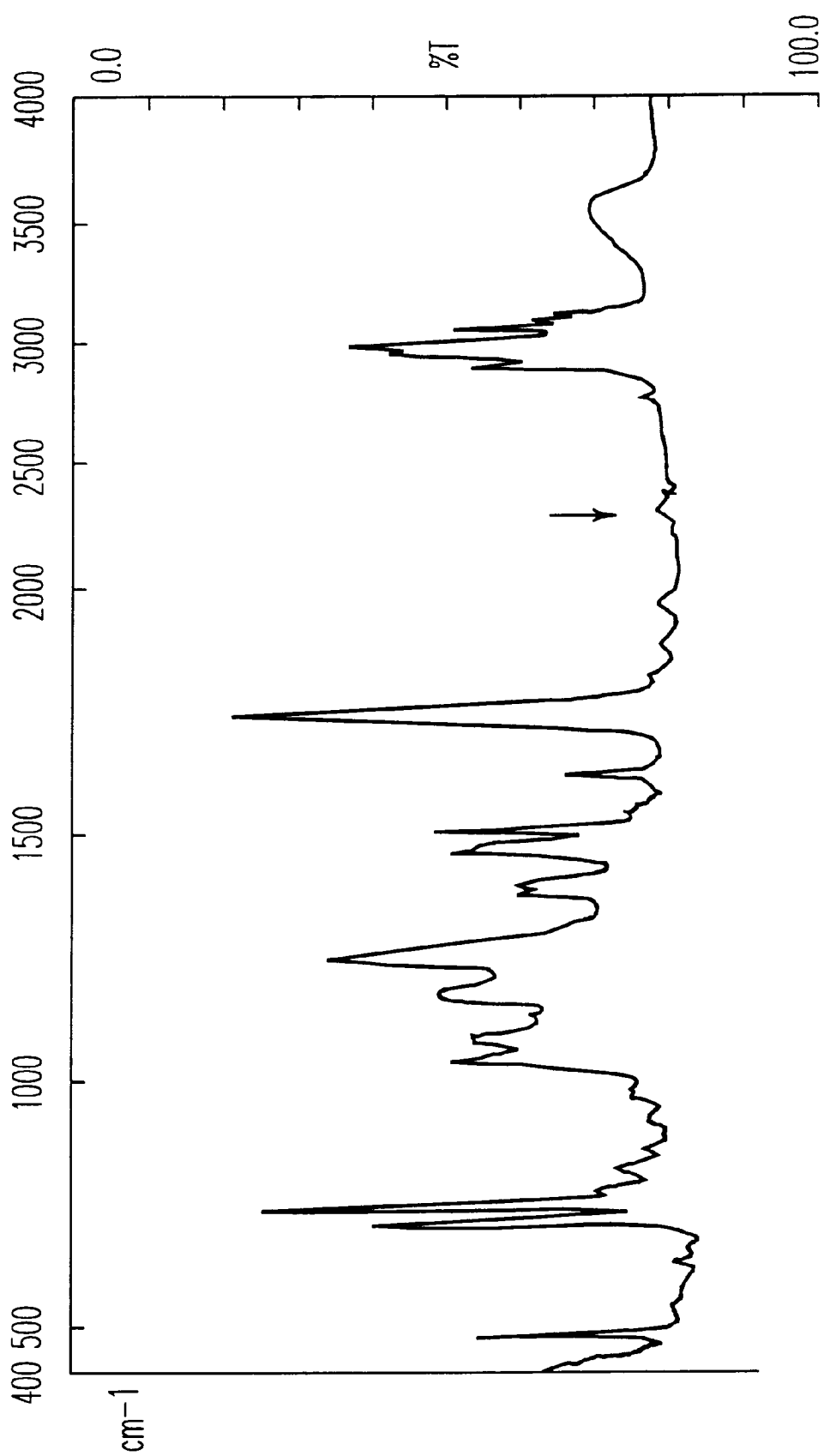
FIG. 9 is an IR chart of a raw material mixture before the reaction in the preparation of a coating resin composition in Example 8.
Figure 10:
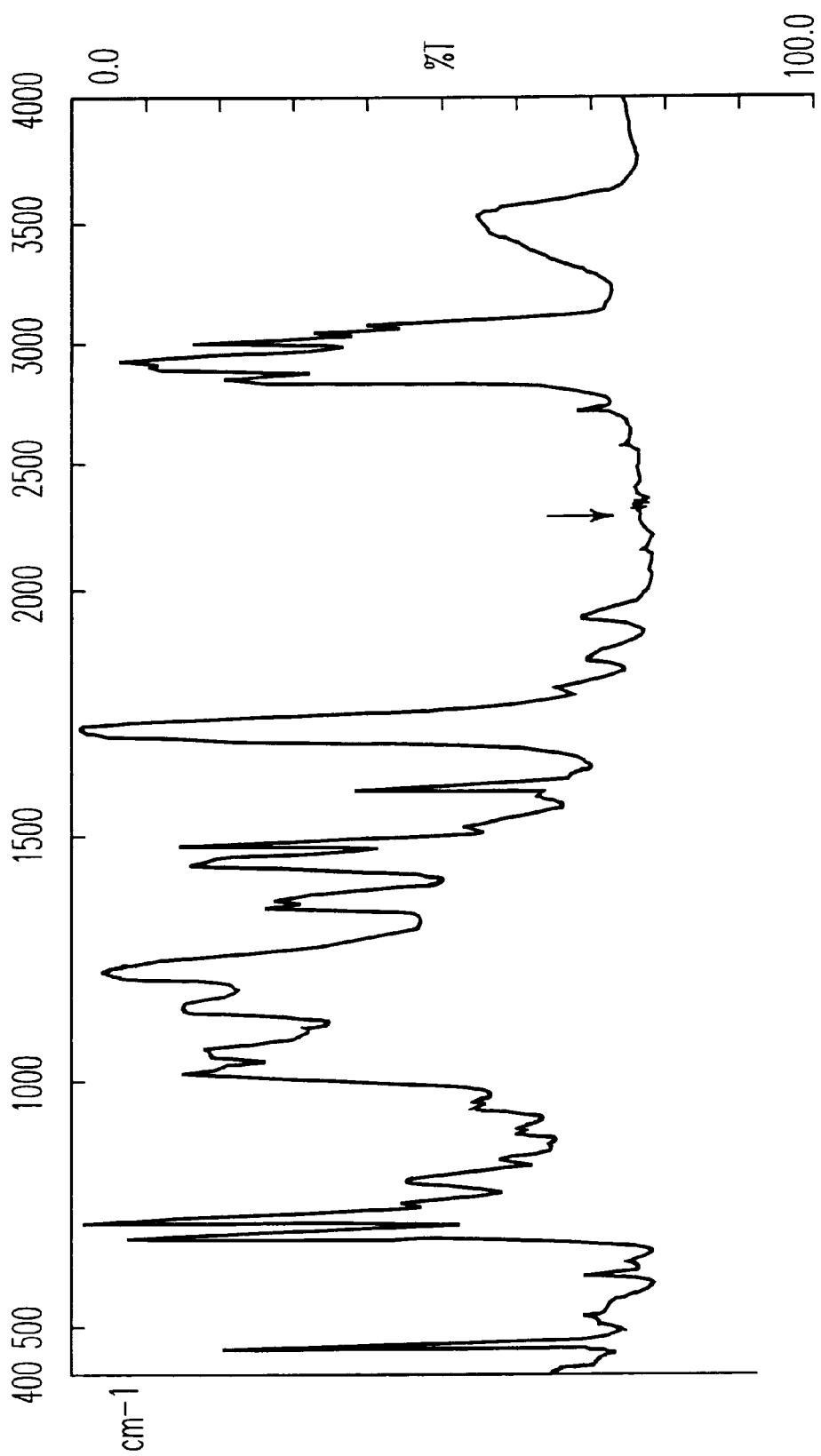
FIG. 10 is an IR chart of the raw material mixture after the reaction in the preparation of the coating resin composition in Example 8.

In a 200 ml flask were placed 8.4 g (0.0014 mol as an isocyanate) of a polyurethane resin derivative obtained in Example 1, 50 g (0.05 mol as a hydroxyl group) of an acrylpolyol (A-801, made by Dainippon Ink & Chemicals, Inc., nonvolatile content=50% by weight, hydroxyl group concentration=0.001 mol/g), 7 g of toluene and 0.3 g of a 1 wt % toluene solution of dibutyltin dilaurate, followed by heating and stirring at 90° C. for 5 hours, to obtain a coating resin composition. FIGS. 9 and 10 show IR spectra of the coating resin composition before and after the heating and stirring. After the heating and stirring, a peak assigned to the isocyanate disappeared, and hence, it could be confirmed that the reaction was completed.

The thus obtained coating resin composition was so stable that it did not give rise to any viscosity change even after the lapse of 1 month or more at ordinary temperature.

Next, 10.0 g (0.0074 mol as a hydroxyl group) of the coating resin composition was mixed with 2.71 g (0.0081 mol as an isocyanate) of a polyisocyanate (D160N), and the mixture was then applied onto a mild steel plate so that the thickness of a coating film might be 20 μm. After drying for 10 minutes, heating was made at 80° C. for 2 hours.

The physical properties of the obtained coating film were as follows.

TABLE 1

| Contact angle to water: | 98° |
|---|---|
| Pencil hardness: | HB (scratched), 3 H (broken) |
| Folding: | No trouble at 2 mm |
| Checks: | 100/100 |
| Rubbing test: (xylene) | Film reduction = 1 μm or less at 100 times |
| Transparency of coating film: | Slightly cloudy |

EXAMPLE 9

In a 200 ml flask were placed 3.4 g (0.0006 mol as an isocyanate) of a polyurethane resin derivative obtained in Example 1, 30 g (0.03 mol as a hydroxyl group) of an acrylpolyol (A-801, made by Dainippon Ink & Chemicals, Inc., nonvolatile content=50% by weight, hydroxyl group concentration=0.001 mol/g), 7 g of toluene and 0.1 g of a 1 wt % toluene solution of dibutyltin dilaurate, followed by heating and stirring at 90° C. for 3 hours. The obtained reaction mixture was so stable that it did not give rise to any viscosity change even after the lapse of 1 month or more.

Next, 15.0 g (0.01 mol as a hydroxyl group) of the reaction mixture was mixed with 3.8 g (0.011 mol as an isocyanate) of a polyisocyanate (D160N), and the mixture was then applied onto a mild steel plate so that the thickness of a coating film might be 16 μm. After drying for 10 minutes, heating was made at 80° C. for 2 hours.

The physical properties of the obtained coating film were as follows.

TABLE 2

| Contact angle to water: | 98° |
|---|---|
| Pencil hardness: | F (scratched), 4 H (broken) |
| Folding: | No trouble at 2 mm |
| Checks: | 100/100 |
| Rubbing test: (xylene) | No film reduction at 100 times |
| Transparency of coating film: | Slightly cloudy |

EXAMPLE 10

In a 100 ml flask were placed 1.07 g (0.00006 mol as an isocyanate) of a polyurethane resin derivative obtained in Example 4, 30 g (0.03 mol as a hydroxyl group) of an acrylpolyol (A-801, made by Dainippon Ink & Chemicals, Inc., nonvolatile content=50% by weight, hydroxyl group concentration=0.001 mol/g) and 12.7 g of toluene, followed by heating and stirring at 90° C. for 5 hours. The resulting coating resin composition was so stable that it did not give rise to any viscosity change even after the lapse of 1 month or more.

Next, 15.0 g (0.01 mol as a hydroxyl group) of the coating resin composition was mixed with 3.8 g (0.011 mol as an isocyanate) of a polyisocyanate (D160N), and the mixture was then applied onto a mild steel plate so that the thickness of a coating film might be 15 μm. After drying for 10 minutes, heating was made at 80° C. for 2 hours.

The physical properties of the obtained coating film were as follows.

TABLE 3

| Contact angle to water: | 102° |
|---|---|
| Pencil hardness: | F (scratched), 4 H (broken) |
| Folding: | No trouble at 2 mm |
| Checks: | 100/100 |
| Rubbing test: (xylene) | Film reduction = 1 μm or less at 100 times |
| Transparency of coating film: | Cloudy |

EXAMPLE 11

The total amount of a reaction solution (0.0075 mol as an isocyanate) obtained in Example 5 was mixed with 7.52 g (0.0072 mol as a hydroxyl group) of an acrylpolyol (A-801), and the mixture was then aged at room temperature for 4 hours. Afterward, the mixture was applied to an aluminum plate so that the thickness of a coating film might be 6 μm. After drying for 10 minutes, the plate was heated at 80° C. for 2 hours. A contact angle between the obtained coating film and water was 101°. The coating film was transparent.

EXAMPLE 12

The total amount of a coating resin composition (0.008 mol as an isocyanate) obtained in Example 6 was mixed with 7.94 g (0.008 mol as a hydroxyl group) of an acrylpolyol (A-801), and the mixture was then aged at room temperature for 3 hours. Afterward, the mixture was applied to an aluminum plate so that the thickness of a coating film might be 7 μm. After drying for 10 minutes, the plate was heated at 80° C. for 2 hours. A contact angle between the obtained coating film and water was 105°. The coating film was cloudy.

EXAMPLE 13

In a 50 ml flask were placed 15 g (0.0038 mol as an isocyanate) of a polyurethane resin derivative obtained in Example 7 and 0.85 g (0.0006 mol as a hydroxyl group) of polyoxyethylene (hydroxyl group equivalent=1470) represented by the general formula (6)

$$HO(CH_2CH_2O)_rCH_2CH_2CH_3 \qquad (6)$$

followed by heating and stirring at 90° C. for 3 hours. To 5.0 g (0.001 mol of an isocyanate) of the resulting reaction solution, 14.7 g (0.0147 mol as a hydroxyl group) of an acrylpolyol (A-801) and 6 g of toluene were added, followed by heating and stirring at 90° C. for 30 minutes, to obtain a coating resin composition. Here, r is an integer.

After cooling, this coating resin composition was mixed with 5.0 g (0.015 mol as an isocyanate) of a polyisocyanate (D160N) and 6 g of toluene, and the mixture was then applied onto a mild steel plate so that the thickness of a coating film might be 15 μm. After drying for 10 minutes, the plate was heated at 80° C. for 2 hours.

The physical properties of the obtained coating film were as follows.

TABLE 4

| Contact angle to water: | 99° |
|---|---|
| Pencil hardness: | B (scratched), 4 H (broken) |
| Folding: | No trouble at 2 mm |
| Checks: | 100/100 |
| Rubbing test: (xylene) | No film reduction at 100 times |
| Transparency of coating film: | Transparent |

As shown in Table 4, the thus obtained coating film was completely transparent, and therefore, when a polyoxyalkylene containing one hydroxyl group in one molecule was reacted with a polyurethane resin derivative, it could be confirmed that compatibility between the polyurethane resin derivative and a hydroxyl group-containing resin was improved.

EXAMPLE 14

In a 50 ml flask were placed 15 g (0.0024 mol as an isocyanate) of a polyurethane resin derivative obtained in Example 1, 3.5 g (0.0024 mol as a hydroxyl group) of a polyoxyethylene (hydroxyl group equivalent=1470) represented by the above general formula (6) and 0.1 g of a 1 wt % toluene solution of dibutyltin dilaurate, followed by heating and stirring at 80° C. for 4 hours. Next, 4.0 g of the resulting reaction solution was mixed with 15 g (0.017 mol as a hydroxyl group) of a fluorine-containing polyol (F-600, made by Asahi Glass Co., Ltd., hydroxyl group equivalent= 1900), 5.7 g (0.017 mol as an isocyanate) of a polyisocyanate (D160N) and 10.0 g of xylene. The resulting mixture was then applied onto a mild steel plate so that the thickness of a coating film might be 18 μm, dried for 10 minutes, and then heated at 80° C. for 2 hours. The contact angle of the obtained coating film to water was 101°, and the coating film was colorless and transparent.

Comparative Example 1
(a comparative example corresponding to Examples 8, 9, 10 and 13)

15 g (0.015 mol as a hydroxyl group) of an acrylpolyol (A-801, made by Dainippon Ink & Chemicals, Inc., non-volatile content=50% by weight, hydroxyl group concentration=0.001 mol/g) was mixed with 5.5 g (0.017 mol as an isocyanate) of a polyisocyanate (D-160N), 0.05 g of a 1 wt % toluene solution of dibutyltin dilaurate and 12 g of toluene, and the resulting mixture was then applied onto a mild steel plate so that the thickness of a coating film might be 20 μm. After drying for 10 minutes, the plate was heated at 80° C. for 2 hours. The physical properties of the obtained coating film were as follows.

TABLE 5

| Contact angle to water: | 83° |
|---|---|
| Pencil hardness: | HB (scratched), 4 H (broken) |
| Folding: | No trouble at 2 mm |
| Checks: | Wholly peeled |
| Rubbing test: (xylene) | Film reduction = 2 μm at 100 times |
| Transparency of coating film: | Substantially transparent |

Comparative Example 2
(a comparative example corresponding to Examples 11 and 12)

8 g (0.008 mol as a hydroxyl group) of an acrylpolyol (A-801) was mixed with 3.2 g (0.008 mol as an isocyanate) of a polyisocyanate (D-140N) and 4 g of xylene, and the resulting mixture was then applied onto an aluminum plate so that the thickness of a coating film might be 7 μm. After drying for 10 minutes, the plate was heated at 80° C. for 2 hours. The contact angle of the obtained coating film to water was 85°.

Comparative Example 3
(a comparative example corresponding to Example 14)

15 g (0.017 mol as a hydroxyl group) of a fluorine-containing polyol (LF-600, a hydroxyl group equivalent= 1900) was mixed with 5.7 g (0.017 mol as an isocyanate) of a polyisocyanate (D-160N) and 10 g of xylene, and the resulting mixture was then applied onto a mild iron plate so that the thickness of a coating film might be 16 μm. After drying for 10 minutes, the plate was heated at 80° C. for 2 hours. The contact angle of the obtained coating film to water was 84°, and the coating film was cloudy.

What is claimed is:

1. A polyurethane resin derivative having a polydimethylsiloxane side chain and an isocyanate group in a main chain of a polyurethane molecule which is obtained by reacting (A) a polydimethylsiloxane having an alkyl group on one terminal and 2-hydroxyl groups on the other terminal with (B) a polyisocyanate having more than two isocyanate groups in one molecule.

2. The polyurethane resin derivative according to claim 1 wherein the polydimethylsiloxane (A) is represented by the general formula (1)

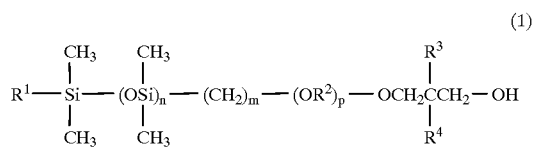

wherein $R^1$ is an alkyl group having 1 to 4 carbon atoms; $R^2$ is an ethylene group or a propylene group; $R^3$ is a hydrogen atom, a methyl group or an ethyl group; $R^4$ is a hydroxyl group or a methylhydroxyl group; n is an integer of 0 to 100; p is an integer of 0 to 100; and m is an integer of 2 to 9.

3. The polyurethane resin derivative according to claim 1 or 2 wherein the polyisocyanate (B) is represented by the general formula (2)

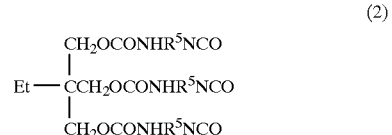

wherein Et is an ethyl group; and $R^5$ is —$(CH_2)_6$—,

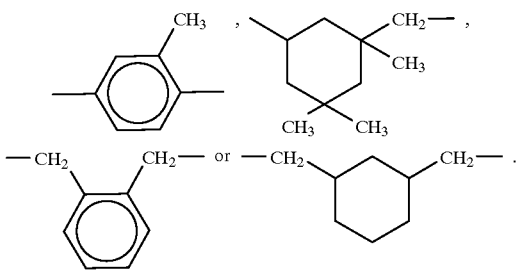

4. A polyurethane resin derivative having a polydimethylsiloxane side chain and an isocyanate group in a main chain of a polyurethane molecule which is obtained by reacting the polydimethylsiloxane represented by the general formula (1)

(1)

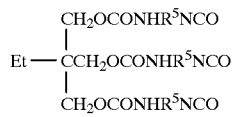

wherein $R^1$ is an alkyl group having 1 to 4 carbon atoms; $R^2$ is an ethylene group or a propylene group; $R^3$ is a hydrogen atom, a methyl group or an ethyl group; $R^4$ is a hydroxyl group or a methylhydroxyl group; n is an integer of 0 to 100; p is an integer of 0 to 100; and m is an integer of 2 to 9, with the polyisocyanate represented by the general formula (2)

(2)

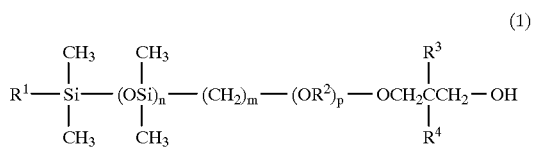

wherein Et is an ethyl group; and $R^5$ is —$(CH_2)_6$—,

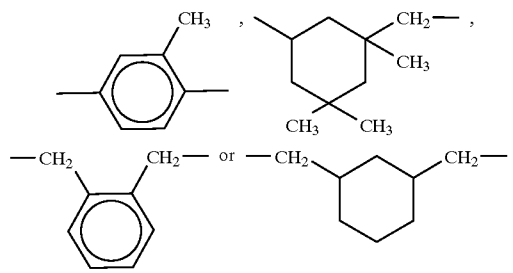

in a molar ratio (1):(2) of 1.4:1 to 1:10.

5. A coating resin composition which is obtained by reacting a polyurethane resin derivative having a polydimethylsiloxane side chain and an isocyanate group in a main chain of a polyurethane molecule according to claim 1 with a hydroxyl group-containing resin.

6. The coating resin composition according to claim 5 wherein the polyurethane resin derivative is obtained by reacting (A) a polydimethylsiloxane having an alkyl group on one terminal and 2 hydroxyl groups on the other terminal with (B) a polyisocyanate having more than two isocyanate groups in one molecule as essential components.

7. The coating resin composition according to claim 6 wherein the polydimethylsiloxane (A) is represented by the general formula (1)

(1)

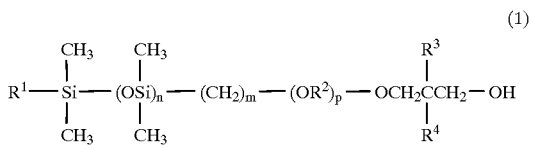

wherein $R^1$ is an alkyl group having 1 to 4 carbon atoms; $R^2$ is an ethylene group or a propylene group; $R^3$ is a hydrogen atom, a methyl group or an ethyl group; $R^4$ is a hydroxyl group or a methylhydroxyl group; n is an integer of 0 to 100; p is an integer of 0 to 100; and m is an integer of 2 to 9.

8. The coating resin composition according to claim 6 wherein the polyisocyanate (B) is represented by the general formula (2)

(2)

wherein Et is an ethyl group; and $R^5$ is —$(CH_2)_6$—,

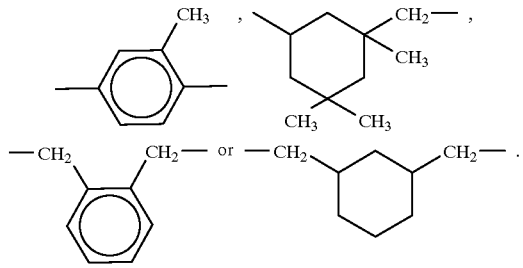

9. The coating resin composition according to claim 5 wherein the polyurethane resin derivative is obtained by reacting the polydimethylsiloxane represented by the general formula (1)

(1)

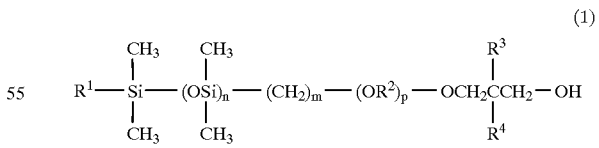

wherein $R^1$ is an alkyl group having 1 to 4 carbon atoms; $R^2$ is an ethylene group or a propylene group; $R^3$ is a hydrogen atom, a methyl group or an ethyl group; $R^4$ is a hydroxyl group or a methylhydroxyl group; n is an integer of 0 to 100; p is an integer of 0 to 100; and m is an integer of 2 to 9, with the polyisocyanate represented by the general formula (2)

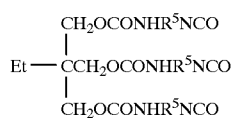
(2)

wherein Et is an ethyl group; and R⁵ is —(CH$_2$)$_6$—,

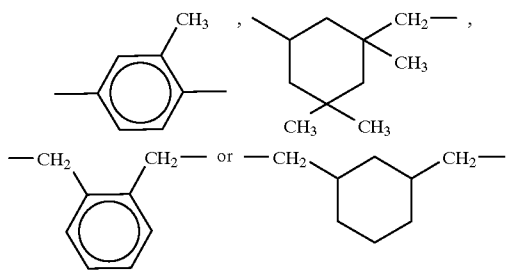

in a molar ratio (1):(2) of 1.6:1 to 1:10.

10. The coating resin composition according to claim 5 wherein the hydroxyl group-containing resin is an acrylpolyol, a fluorine-containing polyol, a polyoxyalkylene, a polyesterpolyol, a polyvinyl alcohol or a mixture of two or more thereof.

11. The coating resin composition according to claim 5 wherein a blend ratio between the hydroxyl group-containing resin and the polyurethane resin derivative in the reaction thereof is such that a ratio of the isocyanate group in the polyurethane resin derivative is in the range of 0.1 to 10 mol % with respect to the hydroxyl group in the hydroxyl group-containing resin.

12. A coating resin composition which is obtained by adding a hydroxyl group-containing resin to a reaction product of a polyurethane resin derivative having a polydimethylsiloxane side chain and an isocyanate group in a main chain of a polyurethane molecule according to claim 1 with a polyoxyalkylene having one hydroxyl group in one molecule.

13. The coating resin composition according to claim 12 wherein the hydroxyl group-containing resin is an acrylpolyol, a fluorine-containing polyol, a polyoxyalkylene, a polyesterpolyol, a polyvinyl alcohol or a mixture of two or more thereof.

14. A method for curing a coating resin composition which comprises the steps of adding a polyisocyanate having 2 or more isocyanate groups in one molecule to a coating resin composition described in claim 5 to accomplish crosslinking.

15. The method for curing a coating resin composition according to claim 14 wherein a blend ratio between the coating resin composition and the polyisocyanate is such that a ratio of an isocyanate group in the polyisocyanate is in the range of 0.3 to 2.0 mol with respect to 1 mol of the hydroxyl group in the coating resin composition.

* * * * *

UNITED STATES PATENT AND TRADEMARK OFFICE
CERTIFICATE OF CORRECTION

PATENT NO. : 5,952,444
DATED : September 14, 1999
INVENTOR(S) : Koichi AYAMA

It is certified that error appears in the above-identified patent and that said Letters Patent is hereby corrected as shown below:

Column 16, line 34, "2-hydroxyl" should read --2 hydroxyl--.

Signed and Sealed this

Twentieth Day of June, 2000

Attest:

Q. TODD DICKINSON

Attesting Officer      Director of Patents and Trademarks